United States Patent
Hong et al.

(10) Patent No.: US 8,073,214 B2
(45) Date of Patent: Dec. 6, 2011

(54) COMPUTER AIDED LESION ASSESSMENT IN DYNAMIC CONTRAST ENHANCED BREAST MRI IMAGES

(75) Inventors: Lin Hong, Monmouth Junction, NJ (US); Hong Shen, Plainsboro, NJ (US); Shuping Qing, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 881 days.

(21) Appl. No.: 12/117,155

(22) Filed: May 8, 2008

(65) Prior Publication Data

US 2008/0285830 A1    Nov. 20, 2008

Related U.S. Application Data

(60) Provisional application No. 60/917,761, filed on May 14, 2007.

(51) Int. Cl.
*G06K 9/00* (2006.01)

(52) U.S. Cl. .................... 382/128; 600/410

(58) Field of Classification Search ............ 600/410, 600/431, 407; 382/128, 131
See application file for complete search history.

(56) References Cited

U.S. PATENT DOCUMENTS

| 2004/0122707 A1* | 6/2004 | Sabol et al. ........... 705/2 |
| 2007/0133852 A1* | 6/2007 | Collins et al. ......... 382/128 |

* cited by examiner

*Primary Examiner* — Hoon Song

(57) ABSTRACT

A method for performing computer-assisted lesion assessment includes acquiring contrast enhanced MRI data. A region of interest is identified. Kinetic properties, morphological properties and pattern of enhancement are determined for the identified region of interest. A score is calculated for each of the kinetic properties, morphological properties, pattern of enhancement. A cumulative score is calculated for the identified region of interest. The scores are provided to a medical practitioner to assist in diagnosing the identified region of interest.

20 Claims, 6 Drawing Sheets

Fig. 5

| MFE | MITR | POCW | Morphological | Pattern of Enhancement |
|---|---|---|---|---|
| > 60% Score 4 | > 50% Score 8 | (iii) Score 8 | MF1 > 0.05 and MF1+MF2>0.07 Score 10 | PEF1 > 0.32 Score 5 |
| 40%-60% Score 2 | 25%-50% Score 4 | (ii) Score 4 | MF3 > 0.3 and MF2 < 0.02 Score 5 | PEF2 > 2.5 Score 3 |
| < 40% Score 0 | < 25% Score 0 | (i) Score 0 | Otherwise Score 0 | Otherwise Score 0 |

COMPUTER AIDED LESION ASSESSMENT IN DYNAMIC CONTRAST ENHANCED BREAST MRI IMAGES

CROSS-REFERENCE TO RELATED APPLICATION

The present application is based on provisional application Ser. No. 60/917,761, filed May 14, 2007, the entire contents of which are herein incorporated by reference.

BACKGROUND OF THE INVENTION

1. Technical Field

The present disclosure relates to lesion assessment and, more specifically, to computer aided lesion assessment in dynamic contrast enhanced breast MRI images.

2. Discussion of Related Art

Breast cancer is the second leading cause of all cancer deaths for women in the United States. Early detection and treatment may significantly increase a patient's chances for survival and recovery. Accordingly, effective breast cancer screening is of particular importance. Various techniques are available for imaging a patient's breast to accurately diagnose breast cancer. For example, x-ray mammography, thermal imaging, magnetic resonance imaging (MRI), etc. Many conventional approaches to breast imaging involve x-ray mammography.

Mammography may be used to identify two types of abnormalities in breast tissue: soft tissue lesions (tumors) and clusters of microcalcifications which may be an early sign of possible cancer. Tumors are generally characterized as palpable lesions while microcalcifications are generally characterized as non-palpable. While mammography remains the most popular clinical modality of breast cancer screening, it may lack sufficient specificity to adequately distinguish between certain types of cancerous lesions and certain types of benign abnormalities. Moreover, mammography may be incapable of effectively imaging dense breast tissue.

MRI may also be used to image a patient's breast. For example, dynamic contrast enhanced breast MRI may be used. In dynamic contrast enhanced MRI, four-dimensional volumetric data, including three spatial dimensions and a temporal dimension, a magnetic contrast agent, for example, a gadolinium based contrast agent (Gd-DTPA), may be delivered and the patient's breast may be imaged continuously over a period of time thereafter. Such a technique may provide a medical practitioner, for example, a radiologist, with the opportunity to monitor the kinetic characteristics of the contrast agent as it interacts with the area of the suspicious region. Such information may be particularly useful in differentiating between cancerous lesions and benign abnormalities, especially when analyzed along with other imaging data such as morphological characteristics and patterns of enhancement formations.

Assessment of such properties as morphological characteristics and patterns of enhancement formations, however, remains something of an art and is difficult to measure quantitatively. Accordingly, such diagnostic techniques may lack a sufficient level of consistency and accuracy.

SUMMARY

A method for performing computer-assisted lesion assessment includes acquiring contrast enhanced MRI data. A region of interest is identified. Kinetic properties, morphological properties and pattern of enhancement are determined for the identified region of interest. A score is calculated for each of the kinetic properties, morphological properties, pattern of enhancement. A cumulative score is calculated for the identified region of interest. The scores are provided to a medical practitioner to assist in diagnosing the identified region of interest.

Determining the morphological properties of the identified region of interest may include identifying a boundary of the region of interest, identifying a core region within the identified boundary of the region of interest, calculating a ring of expansion about the core region, and determining the morphological properties of the identified region of interest based on the calculated ring of expansion.

The steps of identifying a boundary of the region of interest, identifying a core region within the identified boundary of the region of interest, calculating a ring of expansion about the core region, and determining the morphological properties of the identified region of interest based on the calculated ring of expansion may be repeated for multiple image slices with the center image slice forming a key segmentation region of the region of interest and the determined morphological properties for each image slice are averaged.

Determining the pattern of enhancement of the identified region of interest may include calculating a radius of the region of interest, calculating a matching template for the region of interest, identifying a point of highest normalized correlation, determining a first pattern of enhancement based on the identified point of highest normalized correlation using the calculated matching template, and determining a second pattern of enhancement by counting a number of connected components greater than a particular size within the region of interest.

The steps of calculating a radius of the region of interest, calculating a matching template for the region of interest, identifying a point of highest normalized correlation, determining a first pattern of enhancement, and determining a second pattern of enhancement may be repeated for multiple image slices with the center image slice forming a key segmentation region of the region of interest and the patterns of enhancement determined for each image slice may be averaged.

The contrast enhanced MRI data may be acquired from a breast of a subject. A gadolinium based contrast agent (Gd-DTPA) may be used as a contrast agent in acquiring the contrast enhanced MRI data.

Determining kinetic properties may include calculating a maximum focal enhancement (MFE) value as a percentage of maximum intensity difference over an average pre-contrast intensity of the contrast enhanced MRI data, calculating a maximum intensity and time rate (MITR) value as a ratio between maximum intensity difference and a time interval in seconds between contrast administration and a peak time, and calculating a pattern of washout (POCW) as either a pattern of monotonic intensity increase, a pattern of peak intensity within 3 minutes followed by slow intensity decrease or no intensity decrease, or a pattern of peak intensity followed by a quick intensity decrease.

The kinetic properties score, the morphological properties score, and the pattern of enhancement score may be calculated from the determined properties using one or more heuristic rules.

A system for performing computer-assisted lesion assessment includes an image volume acquisition unit for acquiring contrast enhanced MRI data, a display unit for displaying the MRI data, an input unit for receiving an identification of a region of interest from a user, an image processing unit for determining kinetic properties, morphological properties and pattern of enhancement for the identified region of interest within the MRI data, a calculating unit for calculating a score for the kinetic properties, morphological properties, pattern of enhancement, and a cumulative score for the identified region of interest, and an output unit for providing the scores to the user to assist in diagnosing the identified region of interest.

The image processing unit may identify a boundary of the region of interest, identify a core region within the identified boundary of the region of interest, calculate a ring of expansion about the core region, and determine the morphological properties of the identified region of interest based on the calculated ring of expansion.

The identification of the boundary, identification of the core region, calculation of the ring of expansion, and determination of the morphological properties may be determined repeatedly for multiple image slices with the center image slice forming a key segmentation region of the region of interest and the determined morphological properties for each image slice are averaged.

Determining the pattern of enhancement of the identified region of interest may include calculating a radius of the region of interest, calculating a matching template for the region of interest, identifying a point of highest normalized correlation, determining a first pattern of enhancement based on the identified point of highest normalized correlation using the calculated matching template, and determining a second pattern of enhancement by counting a number of connected components greater than a particular size within the region of interest.

Calculating the radius, calculating the matching template, identifying the point of highest normalized correlation, determining the first pattern of enhancement, and determining the second pattern of enhancement may be repeated for multiple image slices with the center image slice forming a key segmentation region of the region of interest and the patterns of enhancement determined for each image slice are averaged.

The contrast enhanced MRI data may be acquired from a breast of a subject. An administration unit may be used to administer a gadolinium based contrast agent (Gd-DTPA) as a contrast agent in acquiring the contrast enhanced MRI data.

A computer system includes a processor and a program storage device readable by the computer system, embodying a program of instructions executable by the processor to perform method steps for performing computer-assisted lesion assessment. The method includes acquiring contrast enhanced MRI data, identifying a region of interest, determining kinetic properties, morphological properties and pattern of enhancement for the identified region of interest, calculating a score the kinetic properties, morphological properties, pattern of enhancement, and a cumulative score for the identified region of interest, and providing scores to a medical practitioner to assist in diagnosing the identified region of interest.

Determining the morphological properties of the identified region of interest may include identifying a boundary of the region of interest, identifying a core region within the identified boundary of the region of interest, calculating a ring of expansion about the core region and determining the morphological properties of the identified region of interest based on the calculated ring of expansion.

Determining the pattern of enhancement of the identified region of interest may include calculating a radius of the region of interest, calculating a matching template for the region of interest, identifying a point of highest normalized correlation, determining a first pattern of enhancement based on the identified point of highest normalized correlation using the calculated matching template and determining a second pattern of enhancement by counting a number of connected components greater than a particular size within the region of interest.

Determining kinetic properties may include calculating a maximum focal enhancement (MFE) value as a percentage of maximum intensity difference over an average pre-contrast intensity of the contrast enhanced MRI data, calculating a maximum intensity and time rate (MITR) value as a ratio between maximum intensity difference and a time interval in seconds between contrast administration and a peak time, and calculating a pattern of washout (POCW) as either a pattern of monotonic intensity increase, a pattern of peak intensity within 3 minutes followed by slow intensity decrease or no intensity decrease, or a pattern of peak intensity followed by a quick intensity decrease.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 5 is a table illustrating an approach for scoring the kinetic features, the morphological features, the pattern of enhancement features, and producing a cumulative score according to an exemplary embodiment of the present invention.

DETAILED DESCRIPTION OF THE DRAWINGS

Figure 1:
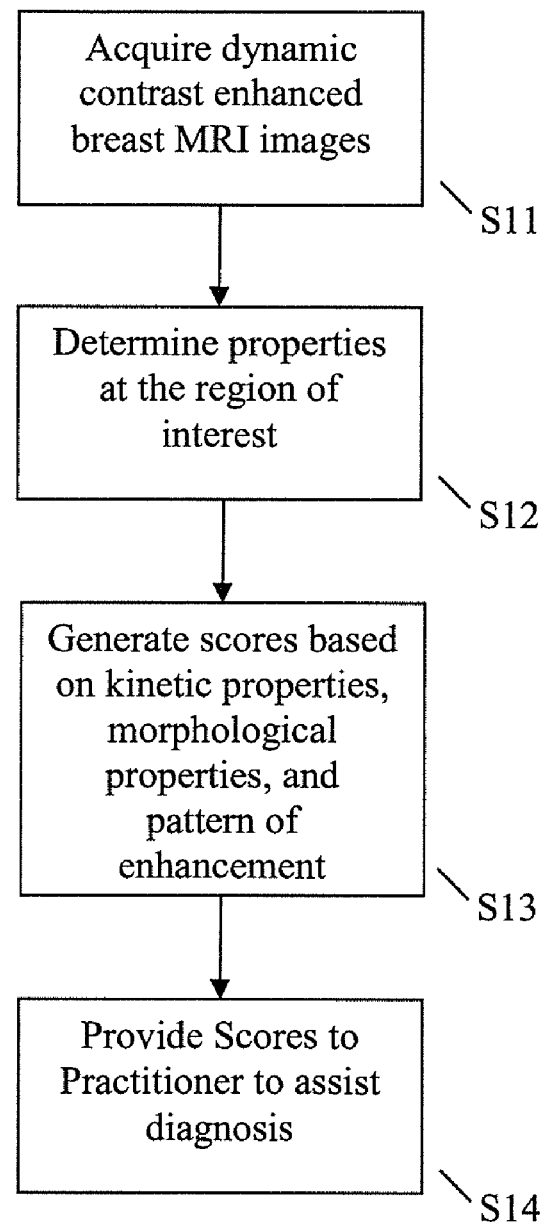
FIG. 1 is a flow chart illustrating a method for providing a computer aided tool to assist medical practitioners in rendering a more accurate and consistent diagnosis of breast cancer according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention may provide a system and method for quantitatively assessing various aspects of image data acquired by dynamic contrast enhanced breast MRI to assist a medical practitioner in differentiating between benign and malignant breast lesions.

Accordingly, a medical practitioner such as a radiologist may be able to achieve a more objective and accurate diagnosis of a suspicious lesion using dynamic contrast enhanced magnetic resonance breast imaging. Accordingly, a set scores may be generated, with multiple aspects of image data each being assigned a numeric value. For example, a numeric value may be assigned based on enhancement kinetic properties, the morphological properties, as well as the pattern of enhancement properties of a suspicious lesion. The numeric values may be consistent and reliable such that similar lesions may consistently produce similar values and those values may be effectively used to help the medical practitioner distinguish between malignant and benign lesions.

As discussed above, in dynamic contrast enhanced breast magnetic resonance imaging (MRI), four-dimensional volumetric data with three spatial and one temporal dimension are acquired within a short interval after application of a gadolinium based contrast agent (Gd-DTPA). Identification of malignant lesions in a dynamic contrast enhanced breast MRI image series may be facilitated by examining the intensity kinetic characteristics such as up-take speed and wash-out of the contrast agent in high intensity regions. Dynamic contrast enhanced breast MRI may be highly sensitive in differentiating soft tissue lesions.

Effective differentiation of malignant lesions from benign lesions may utilize other features in addition to contrast enhancement kinetic properties. For example, morphological characteristics and pattern of enhancement formations may be combined with contrast enhancement kinetic feature data to provide an effective means for diagnosing malignant breast lesions using dynamic contrast enhanced breast MRI.

Enhancement kinetic properties such as in-take speed and wash-out may be characterized by analyzing the intensity of voxels in corresponding image sequence. Assessment of the morphological properties and pattern of enhancement properties may be more complicated. Accordingly, exemplary embodiments of the present invention seek to provide an automated tool that may assist medical practitioners such as radiologists in obtaining objective assessment of each of the characteristics of the enhancement kinetic information, the morphological information, and pattern of enhancement information by analyzing a sequence of three-dimensional MRI volumetric data.

It may be difficult to extract valid features that can effectively characterize the morphological and pattern of enhancement properties of a susceptible lesion from normal tissues in breast MRI images. Cancerous lesions tend to appear as rounded speculated shaped objects which are slightly different from typical benign lesions which tend to be rounded shaped. Accordingly, it may be difficult to design a reliable approach for effectively capturing the minute distinctions between these classes of lesions.

Exemplary embodiments of the present invention may uses a robust object detection technique to locate a region of interest corresponding to a suspicious lesion and then derive a set of measurements that correspond to well-defined diagnosis guidelines that may be presented to physicians. Each of the kinetic properties, morphological properties, and pattern of enhancement properties, may be assessed and quantitatively characterized to provide medical practitioners a more comprehensive view of the suspicious lesion so that a more accurate diagnosis may be made by the medical practitioner.

Exemplary embodiments of the present invention provide an assistant tool to assess the above-identified criteria and/or other criteria that may be used in analyzing pre- and post-contrast breast MRI image series. In forming the assessment, the medical practitioner may identify an area of suspicious lesion tissue within a display of the digital image data. Such a region may typically be located at an area of high intensity in a subtraction or raw image, for example, a rapidly enhanced tissue region. A support region of interest may then be automatically segmented from the MRI image series.

From the support region of interest, the intake and washout properties, morphological properties, and the characteristics of pattern of enhancement may be extracted to generate a set of scores as well as a cumulative score that conform to a set of standard criteria established by the medical community. The medical practitioner may then consult these scores, for example, in addition to other relevant data, in rendering a diagnosis concerning the status of the region of interest. Accordingly, a consistent and reliable explanation of each of the three sets of criteria may be provided.

Computer aided analysis may include two sequential stages. First, in an extraction stage, the support region of interest may be extracted from the input image at the specified position provided by the medical practitioner. Then, in an assessment stage, kinetic, morphological, and pattern of enhancement features may be extracted from the support region of interest. Scores may then be generated for each assessed feature. A cumulative score may then be generated based on the scores for each feature.

Assessment may be performed, for example, on the first subtraction image of the first post-contrast image and the pre-contrast image. In dynamic contrast enhanced breast MRI images, malignant lesions may exhibit spiculate-rounded shape with enhanced ring-like or heterogeneous intensity distribution. While, in general, a lesion may appear to have a relatively higher intensity locally than other tissue structures such as like vessels, intensity alone may be insufficient to sufficiently enable segmentation of the lesion region. Accordingly, morphological data as well as pattern of enhancement properties may play an important role in identifying a suspicious lesion.

Precise 3D segmentation of lesions within an image volume may be impracticable. It may be even more difficult to segment a lesion that exhibits subtle properties such as a spiculate shape and/or ring-like or heterogeneous intensity distribution exhibited by malignant lesions. Accordingly, exemplary embodiments of the present invention perform segmentation in such a way as to preserve the subtle properties of the spiculate shape with ring-like or heterogeneous intensity distribution and may obtain a reasonable segmentation of other normal lesions or normal tissues. Such approaches may emphasize differences between malignant lesions and benign lesions or other normal tissues.

The ability to distinguish malignant lesions from benign lesions using morphological features as well as pattern of enhancement features tends to diminish at image slices towards the ends of the lesions. Accordingly, segmentation may be performed in image slices centered about the slice with the largest segmentation region. This largest segmentation region may be defined as the key segmentation region and in one exemplary embodiment of the present invention; segmentation may be performed within three image slices, with the center image slice being the key segmentation region. Together, the three image slices may be considered the support region of interest. From the support region of interest, morphological and pattern of enhancement features may be extracted and the corresponding scores may be computed. Segmentation may be performed slice by slice and may begin with a starting slice that may be manually provided by the medical practitioner.

An exemplary approach for extracting the support region of interest may be as described below: A mean (m) and a standard deviation (std) may be estimated within a neighborhood of voxels around a manually identified point. The neighborhood may be, for example, an area 50×50×30 voxels. A first-order threshold for identifying the region of interest which may be between −3std to +3std is selected. The slices are binarized using the threshold and cleaned. For each slice, a distance transformation may be applied to the binarized image and a highest peak value p may be identified. The peak value p of each slice may occupy coordinates (xp,yp). Then for each slice, a set of rays may be cast from (xp,yp) in a set of directions d from 0 to 359°. A line segment may be found along each ray from (xp,yp) until either a pixel with an intensity value of zero is found or until the neighborhood boundary is reached. If the length of the line segment is less than a particular threshold, for example 2.5 p and the end point is a pixel with an intensity value of zero, then the end point of the line segment may be labeled as type I. All other line segment end points may be labeled as type II.

If the percentage of type I points are larger than a particular value, for example, 60% then the first-order threshold value may be the final threshold value, if not then the next threshold value within the range of −3std to +3std may be selected and the process may be repeated until an acceptable threshold is discovered.

Once the acceptable threshold is discovered, it may be used to provide slice-wise 3D segmentation of the region of interest. The slice-wise 3D segmentation process may be performed for each slice as described above with respect to determining the acceptable threshold, however, in the actual segmentation, type I points may be grouped to form continuous curve segments consisting of connected points and points that are separated by a gap of no more than a sufficiently small distance. This gap distance may be less than 5° of the circumference of the region of interest and have a distance between the two gap points no greater than 15% of the radius of the region of interest. If the gap is too large then the gap may separate two continuous curve segments. If the gap is sufficiently small, then the pixels on either side of the gap may still be considered part of a continuous curve segment.

Label points that are part of a continuous curve segment of length less than 8 pixels as type III. If the percentage of remaining type I points are less than a threshold, for example, 50%, then the segmentation may be disregarded, otherwise, the type I points may be kept as the boundary of the region of interest and the remaining boundary may be interpolated from the type I points.

If the segmentation in a current slice shares at lest 50% overlap with the segmentation of a previous slice, then the segmentation in the current slice may be kept. Otherwise, the segmentation is disregarded. For any given three consecutive slices, the segmentation of the slice with the largest area of segmentation may be determined as the support region of interest.

A scoring system may be implemented to compute kinetic, morphological, and pattern of enhancement scores. Because different MRI models and magnetic field strengths, etc. may be used in acquiring MRI images, different approaches to scoring may be used. However, such differences are generally less prominent for morphological and pattern of enhancement features. In exemplary embodiments of the present invention, a single scoring system may be used to score each of the kinetic, morphological, and pattern of enhancement properties.

Kinetic features may be computed using the kinetic curve generated from the intensity profile of the corresponding voxels at the susceptible lesion position provided by the medical practitioner. To ensure the stability of estimated kinetic features/scores, an average operation within a small neighborhood, for example including 3×3 pixels, inside support region of interest may be applied. Kinetic features may then be calculated, for example, the following three kinetic features may be calculated: (1) a percentage of maximum focal enhancement (MFE), defined as the percentage of maximum intensity difference over the average pre-contrast intensity, (2) a maximum intensity and time ratio (MITR), defined as the ratio between maximum intensity difference and the time interval in seconds between GD-DTPA administration and peak time, and (3) a pattern of washout (POCW) which captures the property of intensity enhancement dynamics which may be either (i) a pattern of monotonic intensity increase, (ii) a pattern of peak intensity within 3 minutes followed by slow intensity decrease or no intensity decrease, or (iii) a pattern of peak intensity followed by a quick intensity decrease. The maximum intensity difference may be defined as the difference between the peak (maximum) enhancement intensity and the average pre-contrast intensity.

Morphological features may be computed based on the support region of interest. Before morphological feature computation, the segmentation result may first be validated to determine whether the indicated tissue is actually a normal anatomical tissue such as blood vessel. This validation may be achieved by checking the ratio of the number of slice in segmentation over the mean radius of the 2D cross section of the segmentation result in each slice. If it is validated that the segmentation is a legitimate lesion region, then the boundary of the support regions of interest may be examined to determine the morphological feature value.

Pattern of enhancement features may then be extracted from within the support region of interest. As is the case with morphological feature estimation, the segmentation result may be validated before the pattern of enhancement feature extraction procedure is applied. The pattern of enhancement feature extraction procedure may generate a ring-like template of the form:

$$Td(x, y) = C\left[1 - \frac{x^2 + y^2}{2\pi\delta^2}\right]e^{-\frac{x^2+y^2}{2\delta^2}} \quad (1)$$

where C is a positive constant and δ is the radius of the current 2D support region of interest, to assess the ring-like intensity distribution.

After the kinetic, morphological, and pattern of enhancement features are extracted, a number of heuristic rules may be applied to the extracted features to generate a set of scores characterizing the kinetic, morphological, and pattern of enhancement properties according to the guidelines established in the scoring system. A cumulative score may then also be computed. The cumulative score may then be used by the medical practitioner as a factor in rendering a diagnosis. A particular range of cumulative scores may be suggestive of a malignant lesion. For example, if the cumulative score is between 21 and 35, the cumulative score may be highly suggestive of a malignant lesion. A cumulative score between 14 and 21 may be moderately suggestive of a malignant lesion. Other cumulative scores may be suggestive of a benign lesion.

FIG. 1 is a flow chart illustrating a method for providing a computer aided tool to assist medical practitioners in rendering a more accurate and consistent diagnosis of breast cancer according to an exemplary embodiment of the present invention. First dynamic contrast enhanced breast MRI images are acquired (Step S10). A region of interest is then selected based at least in part on manual identification (Step S11). This may be performed, for example, by a medical practitioner first identifying a potential lesion and then a support region of interest may be automatically identified in the vicinity of the identified potential lesion. Next, kinetic properties, morphological properties, and pattern of enhancement formation properties are determined at the region of interest (Step S12). A set of scores are then generated to accurately and reliably quantify the kinetic properties, the morphological properties, and the pattern of enhancement formation properties (Step S13). The generated scores may then be displayed to the medical practitioner to aid in the rendering of a diagnosis (Step S14).

Figure 2:
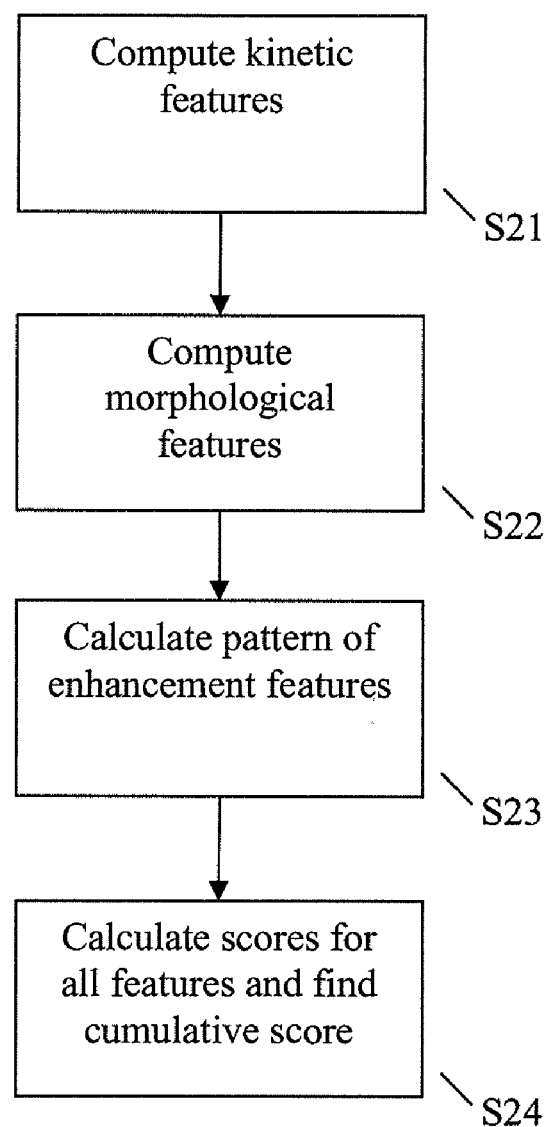
FIG. 2 is a flow chart illustrating a method for quantitatively characterizing a suspicious lesion within a support region of interest according to an exemplary embodiment of the present invention.

FIG. 2 is a flow chart illustrating a method for quantitatively characterizing a suspicious lesion within a support region of interest according to an exemplary embodiment of the present invention. First, kinetic features may be computed (Step S21). Kinetic features may include, for example, the percentage of maximum focal enhancement (MFE), the maximum intensity and time ratio (MITR), and the pattern of washout (POCW). Then, the morphological features may be computed (Step S22), for example, as discussed below with reference to FIG. 3. Then the pattern of enhancement features may be calculated (Step S23), for example, as discussed below with reference to FIG. 4. Then, scores may be calculated for the kinetic features, the morphological features, the pattern of enhancement features, and a cumulative score (Step S24), for example, as discussed below with reference to FIG. 5.

Figure 3:
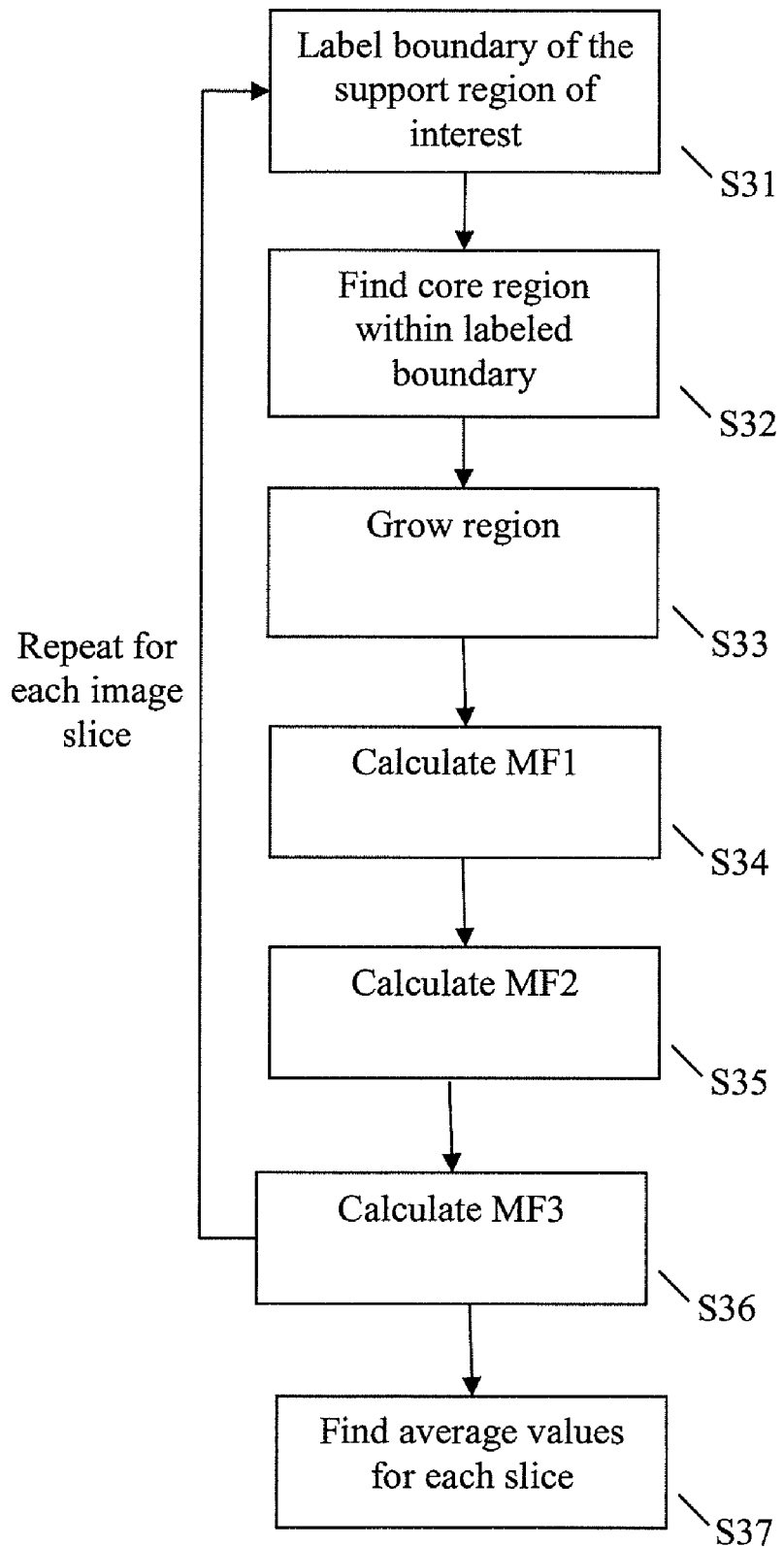
FIG. 3 is a flow chart illustrating a method for computing morphological features according to an exemplary embodiment of the present invention.

FIG. 3 is a flow chart illustrating a method for computing morphological features according to an exemplary embodiment of the present invention. The following method may be applied for each slice within the support region of interest. First, the boundary of the support region of interest may be labeled (Step S31). Next, a core region may be found from within the boundary (Step S32). The core region may be a smooth rounded center of the bound region. The core region may then be "grown" by calculating a ring of expansion about the core region (Step S33). Next, first morphological feature MF1 may be calculated as the ratio of the bound pixels that are neither inside the ring of expansion nor inside the core region over a first constant L1 plus the length of the boundary (Step S34). The second morphological feature MF2 may be calculated as the ratio of the radius of the 2D support region of interest over a second constant L2 plus the number of boundary pixels inside the expansion ring (Step S35). The third morphological feature MF3 may be calculated as the ratio of the radius of the 2D support region of interest over the longest side of the bounding box of the support region of interest (Step S36). After Steps S31-S36 have been performed for each image slice, the final values of MF1, MF2 and MF3 may be calculated by finding the mean average of the respective value for each slice (Step S37).

Figure 4:
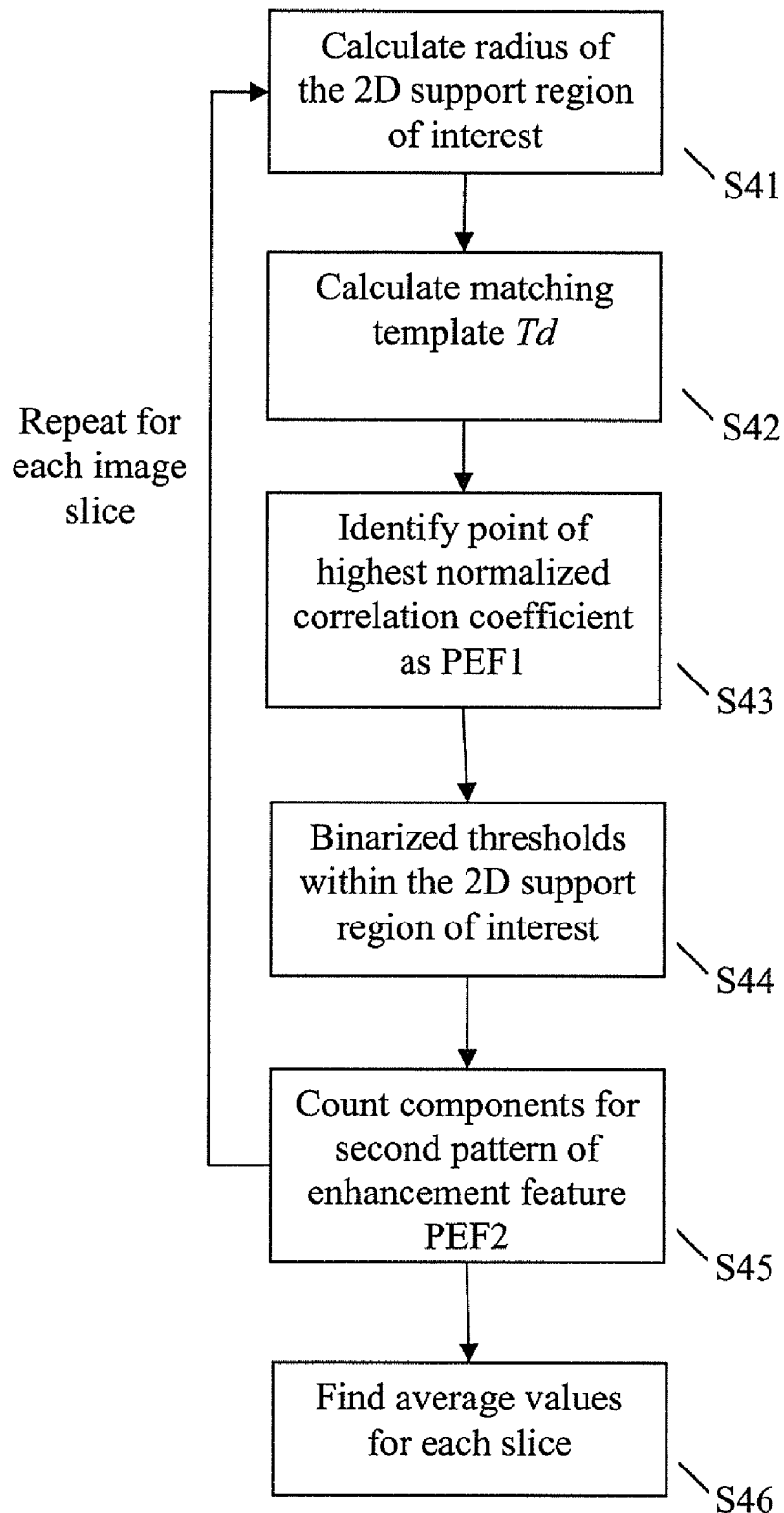
FIG. 4 is a flow chart illustrating for calculating a pattern of enhancement features according to an exemplary embodiment of the present invention.

FIG. 4 is a flow chart illustrating for calculating a pattern of enhancement features according to an exemplary embodiment of the present invention. The following method may be applied for each slice within the support region of interest. First, a radius of the 2D support region of interest is calculated (Step S41). The calculated radius may be used as δ to generate a matching template Td in accordance with equation 1 discussed above (Step S42). A local neighborhood of a radius x and centered at the centroid of the support region of interest may then be searched to identify the point of highest normalized correlation coefficient as a first pattern of enhancement feature PEF1 using the calculated template Td (Step S43). For each threshold from $I(x,y,z)-3std$ to $I(x,y,z)+3std$, $I(x,y,z)$ may be binarized within the 2D support region of interest (Step S44). Also for each threshold from $I(x,y,z)-3std$ to $I(x,y,z)+3std$, $I(x,y,z)$, the number of connected components with a size less than 25% of the 2D support region of interest may be counted as the second pattern of enhancement feature PEF2 (Step S45). After Steps S41-S45 have been performed for each image slice, the final values of PEF1 and PEF2 may be calculated by finding the mean average of the respective value for each slice (Step S46).

FIG. 5 is a table illustrating an approach for scoring the kinetic features, the morphological features, the pattern of enhancement features, and producing a cumulative score according to an exemplary embodiment of the present invention. This table is offered for exemplary purposes only and it is to be understood that different values may be selected depending on the desired scale of scores. For this example, the constants L1 and L2 discussed above with reference to FIG. 3 may each be set at 20. Accordingly, an MFE of less than 40% is attributed a score of 0, an MFE between 40% and 60% is attributed a score of 2, and an MFE greater than 60% is attributed a score of 4. An MITR of less than 25% is attributed a score of 0, an MITR of between 25% and 50% is attributed a score of 4, and an MITR of greater than 50% is attributed a score of 8. A POCW of group (i) is attributed a score of 0, a POCW of group (ii) is attributed a score of 4, and a POCW of group (iii) is attributed a score of 8.

Where MF1 is greater than 0.05 and MF1+MF2>0.07 a score of 10 is attributed, where MF3 is greater than 0.3 and MF2 is less than 0.02 a score of 5 is attributed, otherwise a score of 0 is attributed. Where PEF1 is greater than 0.32 a score of 5 is attributed, where PEF2 is greater than 2.5 a score of 3 is attributed, otherwise a score of 0 is attributed.

Figure 6:
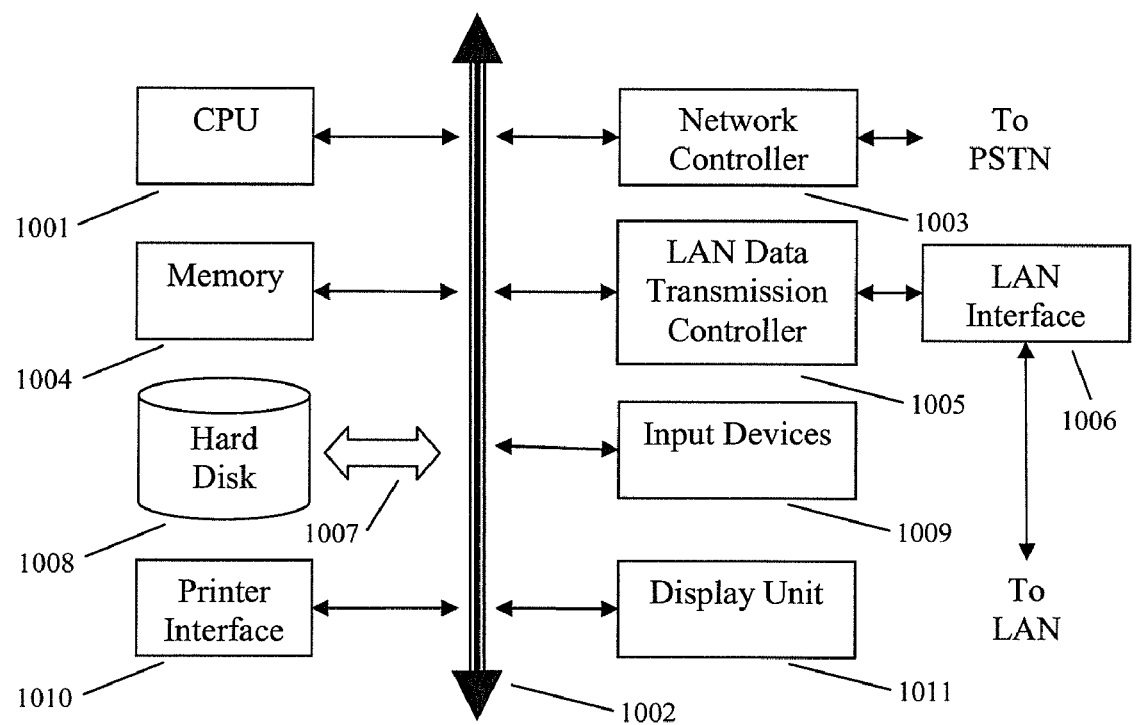
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for performing computer-assisted lesion assessment, comprising:
   acquiring contrast enhanced MRI data;
   identifying a region of interest;
   determining kinetic properties, morphological properties and pattern of enhancement for the identified region of interest;
   calculating a score for each of the kinetic properties, morphological properties, pattern of enhancement, and a cumulative score for the identified region of interest; and
   providing the scores to a medical practitioner to assist in diagnosing the identified region of interest, wherein determining the pattern of enhancement for the identified region of interest includes assessing a ring-like intensity distribution.

2. The method of claim 1, wherein determining the morphological properties of the identified region of interest includes:
   identifying a boundary of the region of interest;
   identifying a core region within the identified boundary of the region of interest; calculating a ring of expansion about the core region; and
   determining the morphological properties of the identified region of interest based on the calculated ring of expansion.

3. The method of claim 2, wherein the steps of identifying a boundary of the region of interest, identifying a core region within the identified boundary of the region of interest, calculating a ring of expansion about the core region, and determining the morphological properties of the identified region of interest based on the calculated ring of expansion are repeated for multiple image slices with the center image slice forming a key segmentation region of the region of interest and the determined morphological properties for each image slice are averaged.

4. The method of claim 1, wherein the contrast enhanced MRI data is acquired from a breast of a subject.

5. The method of claim 1, wherein a gadolinium based contrast agent (Gd-DTPA) is used as a contrast agent in acquiring the contrast enhanced MRI data.

6. The method of claim 1, wherein the kinetic properties score, the morphological properties score, and the pattern of enhancement score are calculated from the determined properties using one or more heuristic rules.

7. A method for performing computer-assisted lesion assessment, comprising:
   acquiring contrast enhanced MRI data;
   identifying a region of interest;
   determining kinetic properties, morphological properties and pattern of enhancement for the identified region of interest;
   calculating a score for the kinetic properties, morphological properties, pattern of enhancement, and a cumulative score for the identified region of interest; and
   providing the scores to a medical practitioner to assist in diagnosing the identified region of interest,
   wherein determining the pattern of enhancement of the identified region of interest includes:
   calculating a radius of the region of interest;
   calculating a matching template for the region of interest;
   identifying a point of highest normalized correlation;
   determining a first pattern of enhancement based on the identified point of highest normalized correlation using the calculated matching template; and
   determining a second pattern of enhancement by counting a number of connected components greater than a particular size within the region of interest.

8. The method of claim 7, wherein the steps of calculating a radius of the region of interest, calculating a matching template for the region of interest, identifying a point of highest normalized correlation, determining a first pattern of enhancement, and determining a second pattern of enhancement are repeated for multiple image slices with the center image slice forming a key segmentation region of the region of interest and the patterns of enhancement determined for each image slice are averaged.

9. A method for performing computer-assisted lesion assessment, comprising:
   acquiring contrast enhanced MRI data;
   identifying a region of interest;
   determining kinetic properties, morphological properties and pattern of enhancement for the identified region of interest;
   calculating a score for the kinetic properties, morphological properties, pattern of enhancement, and a cumulative score for the identified region of interest; and
   providing the scores to a medical practitioner to assist in diagnosing the identified region of interest,
   wherein determining kinetic properties includes:
   calculating a maximum focal enhancement (MFE) value as a percentage of maximum intensity difference over an average pre-contrast intensity of the contrast enhanced MRI data;
   calculating a maximum intensity and time rate (MITR) value as a ratio between maximum intensity difference and a time interval in seconds between contrast administration and a peak time; and
   calculating a pattern of washout (POCW) as either:
      a pattern of monotonic intensity increase;
      a pattern of peak intensity within 3 minutes followed by slow intensity decrease or no intensity decrease; or
      a pattern of peak intensity followed by a quick intensity decrease.

10. A system for performing computer-assisted lesion assessment, comprising:
    an image volume acquisition unit for acquiring contrast enhanced MRI data;
    a display unit for displaying the MRI data;
    an input unit for receiving an identification of a region of interest from a user;
    an image processing unit for determining kinetic properties, morphological properties and pattern of enhancement for the identified region of interest within the MRI data;
    a calculating unit for calculating a score for each of the kinetic properties, morphological properties, pattern of enhancement, and a cumulative score for the identified region of interest; and
    an output unit for providing the scores to the user to assist in diagnosing the identified region of interest,
    wherein determining the pattern of enhancement for the identified region of interest includes assessing a ring-like intensity distribution.

11. The system of system 10, wherein the image processing unit:
    identifies a boundary of the region of interest;
    identifies a core region within the identified boundary of the region of interest;
    calculates a ring of expansion about the core region; and
    determines the morphological properties of the identified region of interest based on the calculated ring of expansion.

12. The system of claim 11, wherein the boundary is identified, the core region is identified, the ring of expansion is calculated, and the morphological properties are determined, repeatedly for multiple image slices with the center image slice forming a key segmentation region of the region of interest and the determined morphological properties for each image slice are averaged.

13. The system of claim 10, wherein the contrast enhanced MRI data is acquired from a breast of a subject.

14. The system of claim 10, additionally including an administration unit for administering a gadolinium based contrast agent (Gd-DTPA) as a contrast agent in acquiring the contrast enhanced MRI data.

15. A system for performing computer-assisted lesion assessment, comprising:
- an image volume acquisition unit for acquiring contrast enhanced MRI data;
- a display unit for displaying the MRI data;
- an input unit for receiving an identification of a region of interest from a user;
- an image processing unit for determining kinetic properties, morphological properties and pattern of enhancement for the identified region of interest within the MRI data
- a calculating unit for calculating a score for the kinetic properties, morphological properties, pattern of enhancement, and a cumulative score for the identified region of interest; and
- an output unit for providing the scores to the user to assist in diagnosing the identified region of interest,
- wherein determining the pattern of enhancement of the identified region of interest includes:
- calculating a radius of the region of interest;
- calculating a matching template for the region of interest;
- identifying a point of highest normalized correlation;
- determining a first pattern of enhancement based on the identified point of highest normalized correlation using the calculated matching template; and
- determining a second pattern of enhancement by counting a number of connected components greater than a particular size within the region of interest.

16. The system of claim 15, wherein calculating the radius, calculating the matching template, identifying the point of highest normalized correlation, determining the first pattern of enhancement, and determining the second pattern of enhancement are repeated for multiple image slices with the center image slice forming a key segmentation region of the region of interest and the patterns of enhancement determined for each image slice are averaged.

17. A computer system comprising:
- a processor; and
- a program storage device readable by the computer system, embodying a program of instructions executable by the processor to perform method steps for performing computer-assisted lesion assessment, the method comprising:
- acquiring contrast enhanced MRI data;
- identifying a region of interest;
- determining kinetic properties, morphological properties and pattern of enhancement for the identified region of interest;
- calculating a score for each of the kinetic properties, morphological properties, pattern of enhancement, and a cumulative score for the identified region of interest; and
- providing the scores to a medical practitioner to assist in diagnosing the identified region of interest,
- wherein determining the pattern of enhancement for the identified region of interest includes assessing a ring-like intensity distribution.

18. The computer system of claim 17, wherein determining the morphological properties of the identified region of interest includes:
- identifying a boundary of the region of interest;
- identifying a core region within the identified boundary of the region of interest;
- calculating a ring of expansion about the core region; and
- determining the morphological properties of the identified region of interest based on the calculated ring of expansion.

19. A computer system comprising:
- a processor; and
- a program storage device readable by the computer system, embodying a program of instructions executable by the processor to perform method steps for performing computer-assisted lesion assessment, the method comprising:
- acquiring contrast enhanced MRI data;
- identifying a region of interest;
- determining kinetic properties, morphological properties and pattern of enhancement for the identified region of interest;
- calculating a score for the kinetic properties, morphological properties, pattern of enhancement, and a cumulative score for the identified region of interest; and
- providing the scores to a medical practitioner to assist in diagnosing the identified region of interest,
- wherein determining the pattern of enhancement of the identified region of interest includes:
- calculating a radius of the region of interest;
- calculating a matching template for the region of interest;
- identifying a point of highest normalized correlation;
- determining a first pattern of enhancement based on the identified point of highest normalized correlation using the calculated matching template; and
- determining a second pattern of enhancement by counting a number of connected components greater than a particular size within the region of interest.

20. A computer system comprising:
- a processor; and
- a program storage device readable by the computer system, embodying a program of instructions executable by the processor to perform method steps for performing computer-assisted lesion assessment, the method comprising:
- acquiring contrast enhanced MRI data;
- identifying a region of interest;
- determining kinetic properties, morphological properties and pattern of enhancement for the identified region of interest;
- calculating a score for the kinetic properties, morphological properties, pattern of enhancement, and a cumulative score for the identified region of interest; and
- providing the scores to a medical practitioner to assist in diagnosing the identified region of interest,
- wherein determining kinetic properties includes:
- calculating a maximum focal enhancement (MFE) value as a percentage of maximum intensity difference over an average pre-contrast intensity of the contrast enhanced MRI data;
- calculating a maximum intensity and time rate (MITR) value as a ratio between maximum intensity difference and a time interval in seconds between contrast administration and a peak time; and
- calculating a pattern of washout (POCW) as either:
  - a pattern of monotonic intensity increase;
  - a pattern of peak intensity within 3 minutes followed by slow intensity decrease or no intensity decrease; or
  - a pattern of peak intensity followed by a quick intensity decrease.

* * * * *